United States Patent
Nam et al.

(10) Patent No.: US 10,407,327 B2
(45) Date of Patent: Sep. 10, 2019

(54) BIOELECTROCHEMICAL SYSTEM HAVING POLYVALENT ION REMOVING FUNCTION

(71) Applicant: KOREA INSTITUTE OF ENERGY RESEARCH, Daejeon (KR)

(72) Inventors: Joo-Youn Nam, Jeju-do (KR); Soon-Chul Park, Jeju-do (KR); Dong-Kook Kim, Daejeon (KR); Namjo Jeong, Daejeon (KR); Chan-Soo Kim, Seoul (KR); Daehee Kim, Jeju-do (KR); Kyo Sik Hwang, Jeju-do (KR); Chul-Ho Park, Gyeonggi-do (KR); Eunjin Jwa, Jeju-do (KR)

(73) Assignee: Korea Institute of Energy Research, Daejeon (KR)

( * ) Notice: Subject to any disclaimer, the term of this patent is extended or adjusted under 35 U.S.C. 154(b) by 879 days.

(21) Appl. No.: 14/896,118

(22) PCT Filed: Jun. 5, 2014

(86) PCT No.: PCT/KR2014/005004
§ 371 (c)(1),
(2) Date: Dec. 4, 2015

(87) PCT Pub. No.: WO2014/196825
PCT Pub. Date: Dec. 11, 2014

(65) Prior Publication Data
US 2016/0137536 A1 May 19, 2016

(30) Foreign Application Priority Data

Jun. 7, 2013 (KR) .................. 10-2013-0065347
Jun. 28, 2013 (KR) .................. 10-2013-0076084
Mar. 7, 2014 (KR) .................. 10-2014-0026874

(51) Int. Cl.
*C02F 1/46* (2006.01)
*C02F 3/00* (2006.01)
(Continued)

(52) U.S. Cl.
CPC .............. *C02F 3/005* (2013.01); *B01D 69/02* (2013.01); *C02F 1/4602* (2013.01);
(Continued)

(58) Field of Classification Search
CPC .......... C02F 3/005; C02F 3/2806; C02F 3/02; C02F 1/4602; C02F 2101/10;
(Continued)

(56) References Cited

U.S. PATENT DOCUMENTS 8,262,872 B2   9/2012  Joshi et al.
8,268,159 B2   9/2012  Balagopal et al.
(Continued)

FOREIGN PATENT DOCUMENTS

CN    102224109 A    10/2011
JP    2012-512326 A   5/2012
(Continued)

OTHER PUBLICATIONS

Joo-Youn Nam et al., Enhanced hydrogen generation using a saline catholyte in a two chamber microbial electrolysis cell, International Journal of Hydrogen Energy, 2011, pp. 15105-15110, vol. 36.
(Continued)

*Primary Examiner* — Walter D. Griffin
*Assistant Examiner* — Cameron J Allen
(74) *Attorney, Agent, or Firm* — Rabin & Berdo, P.C.

(57) ABSTRACT

The present invention provides a bioelectrochemical system for removing a polyvalent ion present in seawater etc., capable of producing electricity. The bioelectrochemical
(Continued)

system according to the present invention comprises: an anode chamber comprising an anode which accommodates an electron produced when treating an organic material in wastewater with a microorganism; a cathode chamber comprising a cathode receiving the electron from the anode, for producing a hydroxide ion by reacting the electron with oxygen and water provided from the outside, and depositing the polyvalent ion inside an electrolyte by using the hydroxide ion; and an anion exchange membrane for blocking the polyvalent ion inside the electrolyte from moving to the anode chamber. Also, the present invention provides the bioelectrochemical system capable of removing the polyvalent ion present in seawater etc., and simultaneously producing hydrogen. The present invention comprises: the anode chamber, provided with the anode to which electrochemically active bacteria are attached, for producing the electron by having organic wastewater, as a substrate, injected thereto; the cathode chamber, provided with the cathode, for removing the polyvalent ion and simultaneously producing a hydrogen gas by having seawater, as an electrolyte, injected thereto; the anion exchange membrane for separating the anode chamber and the cathode chamber and preventing the polyvalent cation in seawater from moving to the anode chamber; and a power source connected between the anode and the cathode.

14 Claims, 3 Drawing Sheets

(51) Int. Cl.

| | | |
|---|---|---|
| *C25B 1/10* | (2006.01) | |
| *C25B 9/10* | (2006.01) | |
| *H01M 8/16* | (2006.01) | |
| *B01D 69/02* | (2006.01) | |
| *C02F 1/461* | (2006.01) | |
| *C02F 3/02* | (2006.01) | |
| *C02F 3/28* | (2006.01) | |
| *C25B 5/00* | (2006.01) | |
| *C25B 11/04* | (2006.01) | |
| *C25B 13/00* | (2006.01) | |
| *H01M 4/90* | (2006.01) | |
| *H01M 4/92* | (2006.01) | |
| *H01M 4/96* | (2006.01) | |
| *C02F 103/08* | (2006.01) | |
| *C02F 101/10* | (2006.01) | |
| *C02F 101/30* | (2006.01) | |
| *H01M 4/86* | (2006.01) | |
| *C02F 5/02* | (2006.01) | |

(52) U.S. Cl.
CPC ...... *C02F 1/46104* (2013.01); *C02F 1/46109* (2013.01); *C02F 3/02* (2013.01); *C02F 3/2806* (2013.01); *C25B 1/10* (2013.01); *C25B 5/00* (2013.01); *C25B 9/10* (2013.01); *C25B 11/0405* (2013.01); *C25B 11/0415* (2013.01); *C25B 11/0447* (2013.01); *C25B 11/0473* (2013.01); *C25B 13/00* (2013.01); *H01M 4/9008* (2013.01); *H01M 4/9083* (2013.01); *H01M 4/92* (2013.01); *H01M 4/96* (2013.01); *H01M 8/16* (2013.01); *C02F 5/02* (2013.01); *C02F 2001/46119* (2013.01); *C02F 2001/46133* (2013.01); *C02F 2001/46142* (2013.01); *C02F 2001/46152* (2013.01); *C02F 2101/10* (2013.01); *C02F 2101/30* (2013.01); *C02F 2103/08* (2013.01); *C02F 2201/4612* (2013.01); *C02F 2201/4618* (2013.01); *C02F 2201/4619* (2013.01); *C02F 2201/46115* (2013.01); *C02F 2203/006* (2013.01); *C02F 2209/20* (2013.01); *C02F 2301/10* (2013.01); *C02F 2303/10* (2013.01); *C02F 2303/22* (2013.01); *H01M 2004/8684* (2013.01); *H01M 2004/8689* (2013.01); *H01M 2250/10* (2013.01); *Y02B 90/14* (2013.01); *Y02E 60/364* (2013.01); *Y02E 60/366* (2013.01); *Y02E 60/527* (2013.01); *Y02W 10/30* (2015.05); *Y02W 10/37* (2015.05)

(58) Field of Classification Search
CPC ...... B01D 69/02; H01M 8/16; H01M 4/9008; H01M 4/9083; H01M 4/92; C25B 5/00; C25B 1/10; C25B 11/0447
See application file for complete search history.

(56) References Cited

U.S. PATENT DOCUMENTS

| | | | |
|---|---|---|---|
| 2007/0138020 A1 | 6/2007 | Balaogpal et al. | |
| 2008/0264778 A1 | 10/2008 | Joshi et al. | |
| 2009/0305084 A1* | 12/2009 | Crookes | H01M 8/16 |
| | | | 429/2 |
| 2010/0270158 A1 | 10/2010 | Logan | |
| 2011/0315560 A1 | 12/2011 | Rabaey et al. | |
| 2011/0315561 A1* | 12/2011 | Rabaey | C02F 1/4618 |
| | | | 205/615 |

FOREIGN PATENT DOCUMENTS

| | | | |
|---|---|---|---|
| KR | 10-2013-0019640 A | 2/2013 | |
| WO | WO 2010/068979 A1 | 6/2010 | |
| WO | WO 2011/112540 A1 | 9/2011 | |
| WO | WO 2011/116272 A1 | 9/2011 | |
| WO | WO-2011116272 A1 * | 9/2011 | H01M 8/16 |

OTHER PUBLICATIONS

Extended European Search Report dated Jan. 9, 2017.
Chinese Office Action dated Dec. 7, 2016.

* cited by examiner

BIOELECTROCHEMICAL SYSTEM HAVING POLYVALENT ION REMOVING FUNCTION

TECHNICAL FIELD

The present disclosure relates to a bioelectrochemical system. More particularly, the present invention disclosure relates to a bioelectrochemical system capable of removing polyvalent ions from seawater, etc.

BACKGROUND ART

Representative among membrane separation processes for seawater desalination are reverse osmosis (RO), electrodialysis (ED), and forward osmosis (FO). To increase the longevity of the membrane and to maintain constant performance of membrane separation process, the scale that is formed as salt compounds are deposited on the membrane should be removed. Hence, a membrane separation process requires pretreatment of seawater to remove scale deposit.

Some seawater ingredients are deposited as scale on a membrane surface with the concentration and pH change thereof, thus degrading the performance of the membrane. Materials causative of scale deposition include calcium carbonate ($CaCO_3$), calcium sulfate ($CaSO_4$), magnesium carbonate ($MgCO_3$), and magnesium sulfate ($MgSO_4$). A desalination pretreatment process of seawater for eliminating such materials causative of scale deposition is dominantly carried out with chemicals or/and membranes (MF, UF). The chemicals for use in the pretreatment process include antiscalants for preventing scale deposition, or acids for maintaining the pH of seawater. Alternatively or in addition, membranes such as microfiltration membranes or ultrafiltration membranes may be used to remove ions causative of scale deposition in the pretreatment process. However, it is criticized that the load of removing scale deposits is just shifted from the desalination process to the pretreatment membrane process.

A bioelectrochemical system (BES) is designed to treat wastewater by use of electrochemically active bacteria, with the concomitant production of electrical energy or hydrogen, and examples of the bioelectrochemical system include a microbial fuel cell (MFC) and a microbial electrolysis cell (MEC). A microbial fuel cell is typically composed of two chambers, that is, an anode chamber and a cathode chamber, which are separated by an ion exchange membrane. A typical reaction that occurs on the anode with glucose as a substrate is shown in Chemical Formula 1. Under an aerobic condition, a reaction shown in Chemical Formula 2 typically proceeds on the cathode. In the anode chamber, biodegradable organic matter is treated to produce electrical energy while in the cathode chamber pH is continuously increased as $OH^-$ is generated.

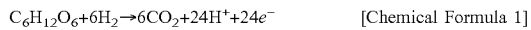
$C_6H_{12}O_6+6H_2O \rightarrow 6CO_2+24H^++24e^-$ [Chemical Formula 1]

$O_2+4e^-+2H_2O \rightarrow 4OH^-$ [Chemical Equation 2]

On the other hand, a microbial electrolysis cell is structurally similar to a microbial fuel cell, but is designed to generate hydrogen from organic material by applying an electric current in the cathode chamber where an anaerobic condition is established. On the cathode, the solution continuously increases in pH as hydrogen gas is produced, as illustrated in the following Chemical Formula 3.

$2H_2O+2e^- \rightarrow H_2\uparrow+2OH^-$ [Chemical Formula 3]

Abundant in ions, seawater has high electroconductivity and can be used as an electrolyte in an electrochemical system. When seawater is introduced into a cathode chamber of the bioelectrochemical system, such as microbial fuel cell and a microbial electrolysis cell, a reduction reaction occurs to generate electrical energy or hydrogen while hydroxide ions are produced to precipitate the polyvalent cations of seawater in the form of $CaCO_3$, or $Mg(OH)_2$. On the whole, bioelectrochemical systems are used for wastewater treatment, electricity generation, and hydrogen generation, but thus far have not been applied to the removal of polyvalent cations from seawater.

DISCLOSURE

Technical Problem

Therefore, it is an object of the present disclosure to remove polyvalent ions from seawater through microbial electrochemical reactions, without the use of chemicals or additional separation membranes.

It is another object of the present disclosure to convert wastewater including biodegradable organic matter into electrical currents while removing polyvalent ions from seawater.

It is a further object of the present disclosure to convert wastewater including biodegradable organic matter into hydrogen gas with a small amount of energy while removing polyvalent ions from seawater.

The objects of the present invention are not limited to the foregoing, and other objects and advantages of the present invention will be more apparent in the following description. In addition, it is readily understood that the objects and advantages of the present invention can be achieved by the means described in the claims and a combination thereof.

Technical Solution

In accordance with an aspect thereof, the present disclosure provides a bioelectrochemical system capable of generating electricity and removing polyvalent ions, comprising: an anode chamber housing an anode that accepts electrons generated when organic matter of wastewater is treated by microorganisms; a cathode chamber housing a cathode that receives the electrons from the anode and at which the electrons moving from the anode chamber react with externally fed oxygen and water to produce hydroxide ions which, in turn, precipitate polyvalent ions of an electrolyte; and an anion exchange membrane for blocking movement of the polyvalent cations of the electrolyte into the anode chamber.

In some particular embodiments, the microorganisms may be electrochemically active bacteria that can be utilized as a substrate for organic matter-containing wastewater, anaerobic digests, urban sewage, industrial wastewater, acid fermentation liquid, etc. The anode chamber may be neutral in pH and may have a temperature range form 20° C. to 100° C., thus maintaining the activity of the electrochemically active bacteria. When the pH of the anode chamber is lower than a neutral pH, the anode chamber is fed with the precipitate of the cathode chamber or a chemical. The anode may be in a form of brush or felt made of graphite or carbon. The cathode may comprise a platinum catalyst or a platinum replacement catalyst. The cathode may be an air-cathode.

In accordance with another aspect thereof, the present disclosure provides a bioelectrochemical system capable of generating hydrogen by use of microorganisms, the system comprising: an anode chamber housing an anode to which electrochemically active bacteria adhere and at which electrons are generated as the electrochemically active bacteria use organic wastewater as a substrate, the organic wastewater being fed into the anode chamber; a cathode chamber housing a cathode at which hydrogen gas is generated from seawater as an electrolyte, the seawater being introduced into the cathode chamber; and an anion exchange membrane for separating the anode chamber and the cathode chamber from each other and for blocking movement of the polyvalent cations of the electrolyte into the anode chamber. For hydrogen gas generation, the electrical potential of the cathode may be made lower than that of the anode by applying at least 0.3 V from the direct current power supply.

In some particular embodiments, the cathode chamber allows for generation of $OH^-$ ions through a reduction reaction, thereby precipitating polyvalent cations of the seawater with the $OH^-$ ions. The polyvalent cations may be $Ca^{2+}$ or $Mg^{2+}$. The bioelectrochemical system may further comprise a means for carrying part of the precipitate of the cathode chamber or an effluent from the cathode chamber into the anode chamber. Both the anode chamber and the cathode chamber may be under an anaerobic condition. The anode may exist as a plurality of replicas. The bioelectrochemical system may further comprise a sensor for measuring a concentration of organic matter in the organic wastewater.

Advantageous Effects

As described above, polyvalent ions of seawater that are causative of scale deposits can be eliminated using a small amount of energy without feeding an additional chemical. In addition, the microbial fuel cell of the present disclosure can remove polyvalent ions from seawater while treating wastewater by microorganisms and while generating electric energy. The microbial electrolysis cell of the present disclosure can remove polyvalent ions from seawater, with the concomitant generation of hydrogen gas at a low energy during the microbial treatment of wastewater.

DESCRIPTION OF THE REFERENCE NUMERALS IN THE DRAWINGS

Figure 1:
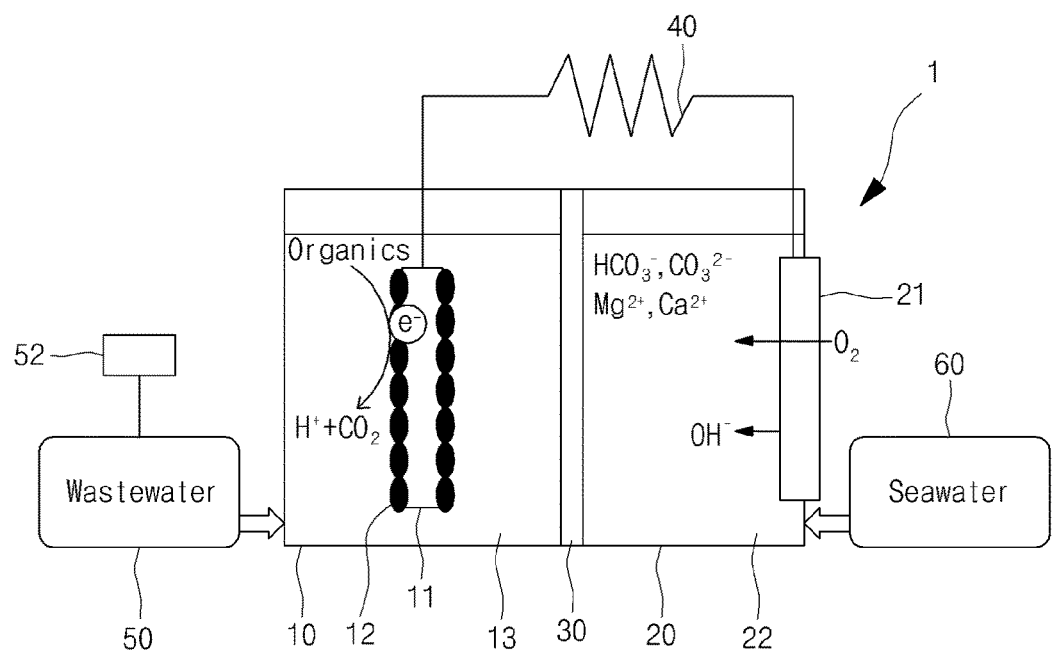
FIG. 1 is a schematic view illustrating an organization of a microbial fuel cell for use as a bioelectrochemical system in accordance with an embodiment of the present disclosure.

| 10: anode chamber | 11: anode |
|---|---|
| 12: microorganisms | 13: anode reactor body |
| 20: cathode chamber | 21: cathode |
| 22: cathode reactor body | 30: anion exchange membrane |
| 40: external circuit | 50: wastewater |
| 60: seawater | 100: microbial electrolysis device |
| 102: anode chamber | 104: cathode chamber |
| 106: anion exchange membrane | 107: anode reactor body |
| 108: anode | 110: electrochemically active bacteria |
| 111: cathode reactor body | 112: cathode |

-continued

| 113: power supply | 114: wastewater reservoir |
|---|---|
| 116: seawater reservoir | |

Best Mode

Reference now should be made to the drawings, throughout which the same reference numerals are used to designate the same or similar components. Below, a description will be given of preferred embodiments of the present invention in conjunction with the accompanying drawings. Throughout the accompanying drawings, the same reference numerals are used to designate the same or similar components. It should be apparent to those skilled in the art that although many specified elements such as concrete components are elucidated in the following description, they are intended to aid the general understanding of the invention and the present invention can be implemented without the specified elements. Further, in the description of the present invention, when it is determined that the detailed description of the related art would obscure the gist of the present invention, the description thereof will be omitted.

FIG. 1 is a schematic diagram showing an organization of a microbial fuel cell for use as a bioelectrochemical system in accordance with an embodiment of the present disclosure. With reference to FIG. 1, the microbial fuel cell 1 comprises an anode chamber 10, a cathode chamber 20, and an ion exchange membrane 30. The anode chamber 10 comprises a reactor body 13 housing an anode 11 that accepts electrons generated when organic matter of wastewater is treated by microorganisms. The cathode chamber 20 has a reactor body 22 housing a cathode 21 that receives the electrons from the anode 11 and at which the electrons moving from the anode chamber 10 react with externally fed oxygen and water to produce hydroxide ions which, in turn, precipitate polyvalent ions of an electrolyte. The ion exchange membrane 30 may be an anion exchange membrane that prevents polycations of the electrolyte from moving toward the anode chamber 10.

In the anode chamber 10, an anaerobic condition is established for the activity of the microorganisms 12. Wastewater is supplied to the anode chamber 10 from a wastewater reservoir 50. The microorganisms 12 is electrochemically active bacteria that can utilized as a substrate for organic matter-containing wastewater, anaerobic digests, urban sewage, industrial wastewater, acid fermentation liquid, etc. In addition, the anode chamber 10 is set to have a temperature of 20° C. to 100° C. with neutral pH so as to maintain the activity of the electrochemically active bacteria. When the pH of the anode chamber 10 is lower than the neutral pH, the precipitate formed in the cathode chamber 20 or a chemical may be fed to the anode chamber 10. In addition, part of the precipitate of the cathode chamber 20 or an effluent from the cathode chamber 20 may be transferred into the anode chamber 10 to enhance the electroconductivity of the anode chamber 10.

In the cathode chamber 20 comprising the cathode 21, an aerobic condition is established for a reduction reaction. Between the anode 11 of the anode chamber 10 and the cathode 21 of the cathode chamber 20, there is a connection via an external circuit 40.

For wastewater treatment and polyvalent ion removal, wastewater is fed into the anode chamber 10 while an electrolyte containing polyvalent ions, e.g., seawater, is supplied to the cathode chamber 20. The wastewater to be fed into the anode chamber 10 contains organic matter, such as in urban sewage, acid fermentation liquid, anaerobic digests, wastewater from food processing plants, etc. In order to maintain a proper concentration of organic matter in the wastewater, a sensor 52 may be used for monitoring the concentration of organic matter.

In the anode chamber 10, electrochemically active bacteria adhere to and grow on the anode 11, oxidizing the organic matter of wastewater to generate protons ($H^+$) and electrons ($e^-$). Here, the anode 11 may be made of graphite or carbon and may be in the form of a brush or felt. The electrons are transferred from the bacteria 12 to the anode 11 and then to the cathode chamber 20 through the external circuit 40 comprising a resistance, with the concomitant production of electrical energy. The resistance of the external circuit may range from $1\Omega$ to $1000\Omega$. In addition, a plurality of anodes 11 may be provided to produce a sufficient amount of electrons.

On the other hand, the electrons transferred from the anode chamber 10 react with oxygen and water in the cathode chamber 20 to produce $OH^-$, as illustrated in Chemical Formula 4.

$$O_2 + 4e^- + 2H_2O \rightarrow 4OH^- \quad \text{[Chemical Equation 4]}$$

The $OH^-$ that is produced in the cathode 20 during the generation of electrical energy increase the pH of the seawater in contact with the cathode 21. At the cathode 21, $OH^-$ precipitates $Ca^{2+}$ and $Mg^{2+}$ of the seawater in the form of $CaCO_3$ and $Mg(OH)_2$, respectively. In addition, $Ca^{2+}$ and $Mg^{2+}$ may be removed as other precipitate forms. In this regard, an anion exchange membrane 30 is employed to prevent cations of seawater from moving into the anode chamber 10.

$$Ca^{2+} + HCO_3^- + OH^- \rightarrow CaCO_3\downarrow + H_2O$$

$$Mg^{2+} + 2OH^- \rightarrow Mg(OH)_2\downarrow \quad \text{[Chemical Formula 5]}$$

Figure 2:
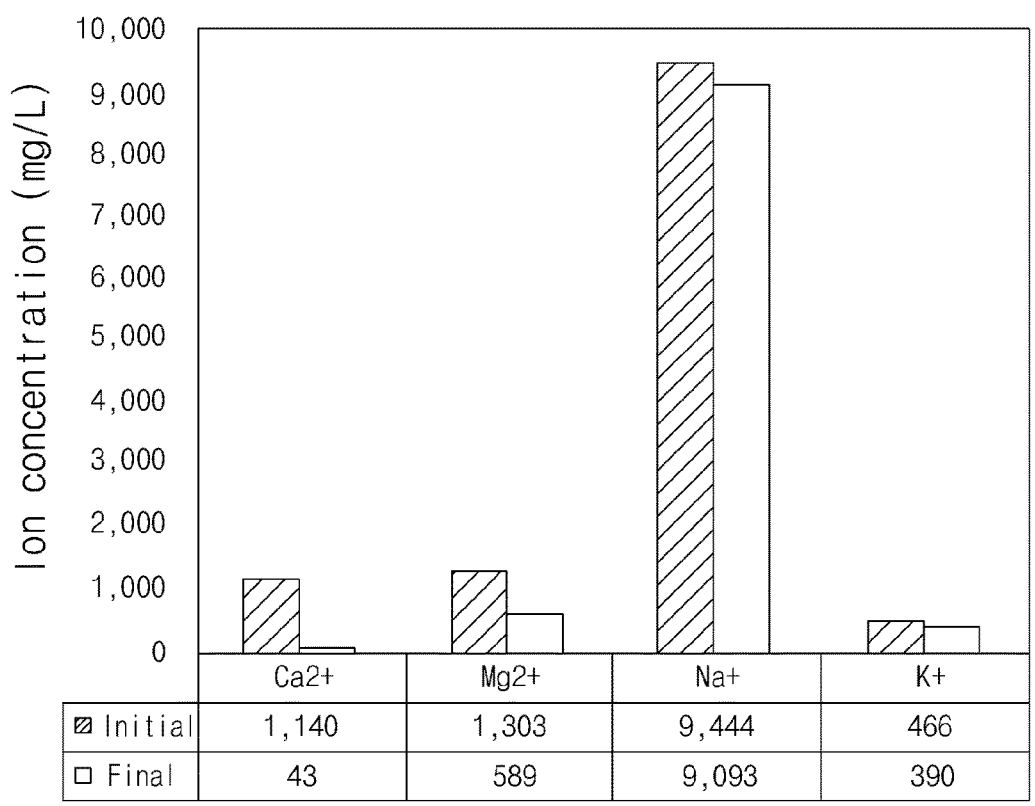
FIG. 2 is a graph showing a polyvalent removal result obtained by an experiment in the microbial fuel cell of FIG. 1

FIG. 2 is a graph depicting a polyvalent removal result obtained by an experiment in the microbial fuel cell of FIG. 1. As is understood from the data of FIG. 2, comparison of polyvalent cations between pre- and post-reaction indicates the removal of $Ca^{2+}$ by 96%, and $Mg^{2+}$ by 55%.

To supply oxygen to the cathode chamber 20, an aerobic condition is maintained. For this, an aerator is needed. However, an air-cathode with one side exposed to air as shown in FIG. 1 may be employed in place of an aerator, so as to reduce the cost of aeration. The cathode 21 may be made of an anti-corrosive, conductive material and may be coated with a catalyst such as platinum or a platinum replacement.

In the cathode chamber 20, a scale deposit on the cathode 21 may be eliminated using a skimmer. Alternatively, the cathode 21 may be vibrated with ultrasound or the cathode chamber 20 may be periodically injected with bubbles, so as to remove the scale deposit from the cathode 21.

Figure 3:
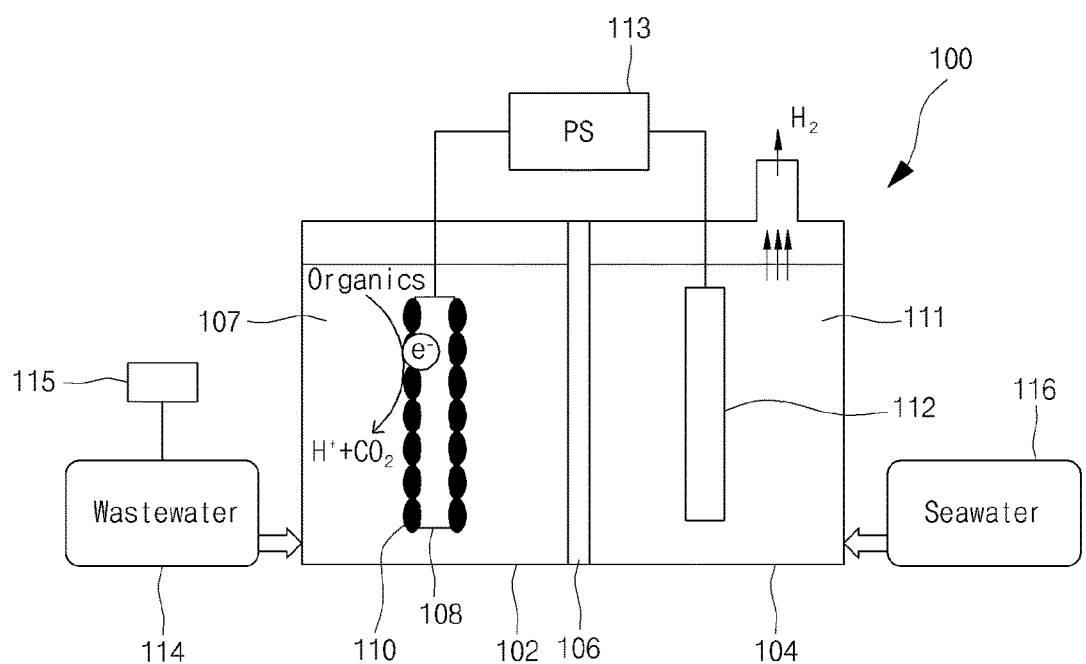
FIG. 3 is a schematic view illustrating an organization of a microbial electrolysis cell for use as a bioelectrochemical system in accordance with an embodiment of the present disclosure.

FIG. 3 is a schematic diagram showing an organization of a microbial electrolysis cell 100 for use as a bioelectrochemical system in accordance with another embodiment of the present disclosure. As shown, the microbial electrolysis cell 100 comprises two chambers, that is, an anode chamber 102 and a cathode chamber 104, which are separated by an anion exchange membrane 106. In the microbial electrolysis cell 100, wastewater is introduced into the anode chamber 102 while seawater is supplied into the cathode chamber 104, with a connection between an anode 108 and a cathode 112 via a direct current power source 113.

The anode chamber 102 has a reactor body 107 that houses an anode 108 and in which an anaerobic condition is established. Wastewater is supplied to the anode chamber 102 from a wastewater reservoir 114. Electrochemically active bacteria 110 adhere to and grow on the anode 108 while oxidizing the organic matter of wastewater to generate protons ($H^+$) and electrons ($e^-$). The electrons are transferred from the bacteria to the anode 108 and then to the cathode chamber 104 through the external circuit. The external circuit may have a resistance of from $1\Omega$ to $20\Omega$.

In addition, the anode chamber 102 is set to have a temperature of 25° C. or higher with neutral pH so as to maintain the activity of the electrochemically active bacteria 110. Since the pH of the anode chamber 102 decreases with the progress of the oxidation reaction, part of the precipitate formed in the cathode chamber 104 or part of an effluent from the cathode chamber 104 may be transferred into the anode chamber 102. The transfer of the precipitate or the effluent is advantageous in that the electroconductivity of the anode chamber 102 can be enhanced without feeding other additives.

In the anode chamber 102, a plurality of anodes 108 may be provided to produce a sufficient amount of electrons. In addition, the anode 108 may be in the form of a brush to maximize its specific surface area, thereby enhancing the reaction rate thereat.

The wastewater to be fed into the anode chamber 102 contains organic matter, such as in urban sewage, acid fermentation liquid, anaerobic digests, wastewater from food processing plants, etc. The wastewater fed into the anode chamber 102 has to contain organic matter at a proper concentration. For this, the wastewater reservoir 114 is installed with a sensor 115 for monitoring concentrations of organic matter. When the concentration of organic matter is below a proper level, the wastewater is concentrated using solar heat before introduction into anode chamber 102.

When the electrical potential of the cathode 112 is made lower than that of the anode 108 by applying at least 0.3 V from the direct current power source 113, hydrogen gas can be generated. Theoretically, the generation of hydrogen requires that the cathode 112 be lower in potential by about −0.6 V than the anode 108. Instead of the direct current power source 113, RED (reverse electrodialysis) power generation or new renewable energy may be used as a power supply.

The cathode chamber 104 has a reactor body 111 housing a cathode 112. The cathode chamber 104 is supplied with seawater from a seawater reservoir 116. The cathode 112 may be made of an anti-corrosive, conductive material coated with a catalyst such as platinum.

The cathode chamber 104 should comprise a hydrogen gas collector (not shown) because hydrogen gas is generated as illustrated in the following Chemical Formula 6. The hydrogen gas generated may be utilized to remove particulate matter of seawater.

$$2H_2O + 2e^- \rightarrow H_2\uparrow + 2OH^- \quad \text{[Chemical Formula 6]}$$

The $OH^-$ that is produced in the cathode 112 precipitates polyvalent cations, such as $Ca^{2+}$ and $Mg^{2+}$, of the seawater. In addition, $Ca^{2+}$ and $Mg^+$ may be deposited in the form of $CaCO_3$ and $Mg(OH)_2$, respectively, or in other forms in which $Ca^{2+}$ and $Mg^{2+}$ are associated with each other. In conjunction with FDFO (Fertiliser Drawn Forward Osmosis), the precipitates may be utilized as a fertilizer.

$$Ca^{2+} + HCO_3^- + OH^- \rightarrow CaCO_3\downarrow + H_2O$$

$$Mg^{2+} + 2OH^- \rightarrow Mg(OH)_2\downarrow \quad \text{[Chemical Formula 7]}$$

Given a scale deposit thereon, the cathode 112 is unlikely to perform a reduction reaction. Hence, the cathode 112 needs to be descaled. For this, a skimmer may be used. Alternatively, the cathode 21 may be vibrated with ultrasound or the cathode chamber 20 may be periodically injected with bubbles, so as to remove the scale deposit from the cathode 21.

The cathode chamber 104 and the anode chamber 102 are separated from each other by the anion exchange membrane 106. Separation between the anode chamber 102 and the cathode chamber 104 by anion exchange membrane 106 is to prevent the cations of seawater from moving into the anode chamber 102. The anion exchange membrane 104 also needs to be decaled by using a skimmer, by vibrating or sonicating, or by periodically injecting bubbles.

Although the preferred embodiment(s) of the present invention have(has) been disclosed for illustrative purposes, those skilled in the art will appreciate that various modifications, additions and substitutions are possible, without departing from the scope and spirit of the invention as disclosed in the accompanying claims.

What is claimed is:

1. A bioelectrochemical system for removing polyvalent ions related to scale deposits in an electrolyte solution while generating energy, the system comprising:
    a microbial fuel cell comprising:
        an anode chamber housing an anode and microorganisms adhered to the anode,
        a cathode chamber housing a cathode, and
        an anion exchange membrane configured for blocking movement of polyvalent ions from the cathode chamber into the anode chamber;
    a wastewater supply in fluid communication with the anode chamber;
    an aqueous electrolyte supply in fluid communication with the cathode chamber; and
    an oxygen supply in fluid communication with the cathode chamber,
    wherein
        the anode chamber accepts electrons generated when organic matter present in the wastewater is treated by the microorganisms,
        the cathode chamber receives the electrons from the anode and the electrons react in the cathode chamber with the supplied water from the electrolyte and the supplied oxygen to produce hydroxide ions,
        the hydroxide ions react with and precipitate polyvalent ions present in the electrolyte, and
        the anion exchange membrane blocks movement of the polyvalent ions from the cathode chamber to the anode chamber.

2. The bioelectrochemical system of claim 1, wherein the microorganisms are electrochemically active bacteria.

3. The bioelectrochemical system of claim 1, wherein the anode chamber maintains a neutral pH and a temperature of 20° C. to 100° C.

4. The bioelectrochemical system of claim 3, wherein to maintain the neutral pH the anode chamber is fed with a precipitate of the cathode chamber or a chemical when the pH of the anode chamber is lower than the neutral pH.

5. The bioelectrochemical system of claim 1, wherein the anode comprises a plurality of anodes.

6. The bioelectrochemical system of claim 1, wherein the anode is in a form of brush or felt made of graphite or carbon.

7. The bioelectrochemical system of claim 1, wherein the cathode comprises a platinum catalyst or a platinum replacement catalyst.

8. The bioelectrochemical system of claim 1, wherein the cathode is an air-cathode.

9. The bioelectrochemical system of claim 1, wherein the cathode chamber is under an aerobic condition.

10. The bioelectrochemical system of claim 1, further comprising:
    a power source configured for connecting the anode to the cathode,
    wherein the generated electrons react in the cathode chamber with the water from the electrolyte to produce hydrogen gas.

11. The bioelectrochemical system of claim 10, wherein the cathode chamber allows for generation of $OH^-$ ions through a reduction reaction, thereby precipitating polyvalent cations present in the seawater with the $OH^-$ ions.

12. The bioelectrochemical system of claim 10, wherein both the anode chamber and the cathode chamber are under an anaerobic condition.

13. The bioelectrochemical system of claim 10, wherein the anode comprises a plurality of anodes.

14. The bioelectrochemical system of claim 10, further comprising a sensor configured for measuring a concentration of organic matter in the organic wastewater.

* * * * *